Patented Dec. 11, 1951

2,577,776

UNITED STATES PATENT OFFICE 2,577,776

3,22-DIACYLOXY-5,7,9(11),20(22)-BISNORCHOLATETRAENES

Robert H. Levin, A Vern McIntosh, Jr., and George B. Spero, Kalamazoo, Mich., assignors to The Upjohn Company, Kalamazoo, Mich., a corporation of Michigan No Drawing. Application September 1, 1950, Serial No. 182,891

6 Claims. (Cl. 260—397.5)

The present invention relates to 3,22-diacyloxy-5,7,9(11),20(22)-bisnorcholatetraenes, and to a process for the production thereof. This application is a continuation-in-part of our prior-filed copending application Serial 136,656, filed January 3, 1950.

The compounds of the present invention may be represented by the structural formula:

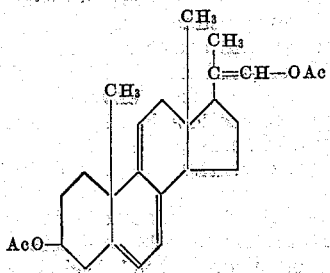

wherein Ac is the residue of an organic carboxylic acid containing from one to eight carbon atoms, inclusive.

It is an object of the present invention to provide a novel group of compounds which are useful in the preparation of steroid compounds containing an oxygen atom at carbon atom eleven. Another object of the invention is the provision of a process for the production of novel compounds, the 3,22-diacyloxy-5,7,9(11),20(22)-bisnorcholatetraenes. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such steroids, particularly those oxygenated at carbon atom eleven, as well as to investigate the biological activity of the unoxygenated compounds and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are those compounds of the above generic formula wherein AcO represents an ester of the 3-hydroxy group with a carboxylic acid containing up to and including eight carbon atoms. Among the acids which can be used are formic, acetic, propionic, butyric, valeric, hexanoic, heptanoic, octanoic, succinic, glutaric, cyclopentanoic, cyclohexanoic, benzoic, toluic, and the like. Preferred acids are the lower-aliphatic acids. The acids may also contain substituents, such as halo, alkyl, and methoxy, which are non-reactive under the reaction conditions employed.

The compounds of the present invention are prepared by the removal of the maleic anhydride radical from a 3,22-diacyloxy-5,7,9(11),20(22)-bisnorcholatetraene adduct of the formula:

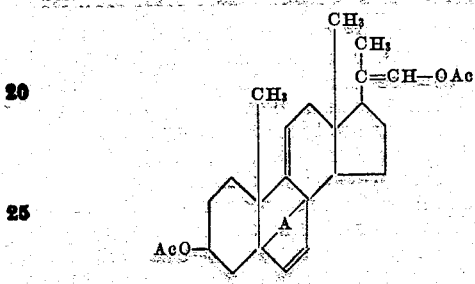

wherein A represents the adduct radical of maleic anhydride, and Ac has the value previously assigned.

Such 3,22-diacyloxy-5,7,9(11),20(22)-bisnorcholatetraene adducts [22-enol esters of 3-acyloxybisnor-5,7,9(11)-cholatrien-22-al adducts] are conveniently prepared by subjecting an adduct of a 3-acyloxybisnor-5,7,9(11)-cholatrien-22-al, of the formula:

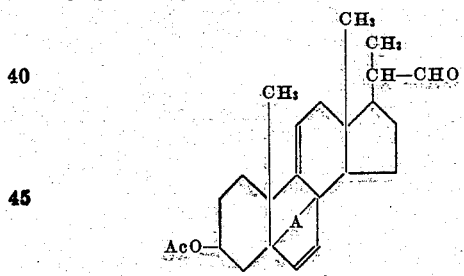

wherein A and Ac have the values previously given, to the action of an acid anhydride or an acide halide in the presence of an alkaline salt of the acid. The starting adducts of 3-acyloxybisnor-5,7,9(11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3-acyloxy-bisnor-5,7,9(11)-cholatrien-22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxy group of the dehydroergosterol acylated by known procedure. Alternatively the 3-hydroxy group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters if desired.

The ester group, when present in the 3-position of dehydroergosterol, is for the purpose of protecting the 3-hydroxy group in subsequent chemical reactions. For this purpose any convenient ester of an organic carboxylic acid, which is non-reactive under the conditions of the reaction, is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cyclopentanoic and cyclohexanoic; and aromatic acids such as benzoic, toluic, and the like. The acids may also contain substituents such as halogen, alkyl, the methoxy radical, and the like, and these substituents will be carried throughout the synthesis. If desired, the acyl group can be changed to another acyl group by saponifying the ester to give a 3-hydroxy compound, which can then be re-esterified as previously described.

A preferred method for preparing some of the dehydroergosteryl adducts comprises the saponification of 3-acyloxy-adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to about minus 80 to plus 30 degrees centigrade, and passing ozone into the solution until about 1.0 to 1.25 moles of ozone per mole of adduct have been absorbed. The temperature of the solution should be maintained below plus 30 degrees centigrade, preferably between a temperature of minus 30 and minus 70 degrees centigrade, during the addition of ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addition of finely-powdered zinc.

As is conventional with ozonizations when conducted in solvents, other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 3,22-diacyloxybisnor-5,7,9(11),-20(22)-cholatetraenes [22-enol esters of adducts of 3 - acyloxybisnor-5,7,9(11)-cholatrien-22-als] can be conveniently prepared by heating the corresponding 3-hydroxy or 3-acyloxy aldehyde maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. The reaction can be conveniently followed by observing the color changes in the reaction mixture, optimum yields being obtained by discontinuing the application of heat when the color of the solution changes from yellow to brown. Ordinarily the reaction is heated at about 140 degrees centigrade for from about four to six hours, but temperatures as low as 100 and as high as 180 degrees centigrade are also operative. The reaction is usually conducted at the boiling point of the anhydride but in the case of the higher-boiling anhydrides, such as benzoic anhydride, a suitable temperature control, such as 100–150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure, and separating the enol ester from alkali metal salts, which procedure yields a product sufficiently pure for most purposes, but which can be further purified by recrystallization from acetone-water, acetone-pentane, or like solvents, if desired.

The method of the invention consists in heating a 3,22 - diacyloxy - 5,7,9(11),20(22) - bisnor-cholatetraene maleic anhydride adduct in the presence of an organic amine at a temperature of about 100 to 225 degrees centigrade, with or without the presence of an organic solvent, and thereafter isolating the product. The method of the invention has the advantage of being conveniently applicable to large scale work in that it is not necessary to remove the components from the reaction mixture to complete the reaction. It also has the further advantage that the desired tetraene can be obtained in a high degree of purity and in excellent yields.

Amines that can be used in the process of the invention are: secondary aliphatic amines such as dimethylamine, diethylamine, dipropylamine, dibutylamine, diamylamine, dioctylamine; tertiary aliphatic amines such as trimethylamine, triethylamine, triamylamine, methyldioctylamine, methyldiethylamine; secondary and tertiary cycloaliphatic amines such as N-methylcyclohexylamine, N,N - dimethylcyclohexylamine, N,N-diethylcyclohexylamine; secondary and tertiary heterocyclic amines such as pyrrolidine, N-methylmorpholine, N-ethylpyrrolidine, morpholine, piperidine, N - methylpiperidine, 2-methylpiperidine, 1,2 - dimethylpiperidine, 1,2,4 - trimethylpiperidine, 2,4,6 - trimethylpiperidine, 1-ethyl - 2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines such as N-methyl aniline, N-ethylaniline, N - butylaniline, N - benzylaniline, N,N-dimethylaniline, N,N-diethylaniline, N,N-dibutylaniline, N, - N - dibenzylaniline, N-methyltoluidine, N,N - diethyltoluidine, N-ethylxylidine, N,N - dimethylaminoethanol, dibutylaminoethanol, N-pyrrolidylethanol, N-piperidylethanol; substituted aromatic amines such as ortho-methoxy - N,N - dimethylaniline, para-ethoxy - N,N-diethylaniline, parachloro-N,N-dimethylaniline, para-bromo-N,N - diethylaniline, para-fluoro - N,N-dibutylaniline, N,N-dimethylmesidine; secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine and the like.

The process of the present invention, then, comprises heating a selected 3,22-diacyloxy-5,7,9(11),20(22)-bisnorchloatetraene maleic anhydride adduct to a temperature between about 100 and 225 degrees centigrade, preferably between about 175 and 200 degrees centigrade, in the presence of an organic amine, removing excess amine, and recovering the product, wherein the maleic anhydride adduct has been eliminated from the molecule, with production of the conjugated double bond system at carbon atoms 5,6:7,8. The time required for the reaction is usually from about one to eight hours, depending upon variable factors such as the particular steroid adduct treated, the amine employed, and the temperature of reaction. Ordinarily, a reaction period of about four hours is entirely satisfactory, although, at the lower temperatures, a more extended period may be employed to advantage. The employment of pressure may in some cases be advantageous, although it is in most cases preferred to conduct the pyrolysis reaction at atmospheric pressure.

The following examples are illustrative of the process and products of the present invention, but are not to be construed as limiting.

*Preparation 1.—Dimethyl maleate adduct of dehydroergosteryl benzoate*

To a solution of 21 grams of dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

*Preparation 2.—Dimethyl maleate adduct of dehydroergosteryl acetate*

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

*Preparation 3.—Dimethyl maleate adduct of dehydroergosteryl formate*

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

*Preparation 4.—Maleic acid adduct of dehydroergosterol*

A solution of 2.0 grams of sodium hydroxide in twenty milliliters of water was added to a solution of 1.73 grams of the maleic anhydride adduct of dehydroergosteryl acetate (M. P. 230–232 degrees centigrade) in forty milliliters of dioxane. The mixture solidified, but dissolved on addition of 300 milliliters of water and heating to eighty degrees centigrade. After half an hour the solution was cooled and made acid with aqueous three normal hydrochloric acid, to give 1.61 grams of precipitate. On crystallization from a dioxane-water mixture, the maleic acid adduct of dehydroergosterol melted at 190–192 degrees centigrade.

*Preparation 5.—Maleic anhydride adduct of 3-heptanoyloxydehydroergosterol*

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3- heptanoyloxydehydroergosterol, melting at 186–191.5 degrees centigrade.

*Preparation 6.—Maleic anhydride adduct of 3 - beta-acetoxybisnor - 5,7,9,(11) - cholatrien-22-al*

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9(11)-cholatrien-22-al, a fine white powder which melted at 187–197 degrees centigrade.

To a solution of 0.30 gram of the maleic anhydride adduct of 3-beta-acetoxybisnor-5,7,9(11)-cholatrien-22-al, in thirty milliliters of ethanol, was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3-beta-acetoxybisnor-5,7,9(11)-cholatrien-22-al, melting at 269–271 degrees centigrade.

*Preparation 7.—Maleic anhydride adduct of 3-beta-acetoxybisnor-5,7,9(11)-cholatrien-22-al*

A two-liter, round-bottom flask was charged with fifty grams (0.93 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter, round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. Aftr addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89-95 percent of the desired aldehyde.

*Preparation 8*

In a manner essentially that described in Preparation 6, the following compounds were prepared.

(1) Maleic anhydride adduct of 3-beta-formoxybisnor-5,7,9(11)-cholatrien-22-al, melting at 95–130 degrees centigrade. 2,4-dinitrophenylhydrazone, melting at 165–168 degrees centigrade.

(2) Maleic anhydride adduct of 3-beta-heptanoyloxybisnor - 5,7,9(11) - cholatrien - 22 - al, melting at 197.5–199 degrees centigrade. 2,4-dinitrophenylhydrazone, melting at 253–257 degrees centigrade.

(3) Dimethyl maleate adduct of 3-beta-benzoyloxybisnor-5,7,9(11)-cholatrien-22-al, melting at 183–187 degrees centigrade. 2,4-dinitrophenylhydrazone, melting at 224–249 degrees centigrade.

(4) Dimethyl maleate adduct of 3-beta-acetoxybisnor-5,7,9(11)-cholatrien-22-al, melting at 172–178 degrees centigrade. 2,4-dinitrophenylhydrazone, melting at 238 to 244 degrees centigrade.

(5) Dimethyl maleate adduct of 3-hydroxybisnor-5,7,9(11)-cholatrien-22-al, melting at 163–170 degrees centigrade. 2,4-dinitrophenylhydrazone, melting at 250–254 degrees centigrade.

In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3-acyloxybisnor-5,7,9(11)-cholatrien-22-al maleic acid adducts are obtained from the maleic acid adduct of 3-acyloxy-dehydroergosterols.

*Preparation 9.—Dimethyl maleate adduct of 3-hydroxybisnor-5,7,9(11)-cholatrien-22-al*

A solution of 2.69 grams (.005 mole) of the dimethyl ester of the maleic acid adduct of dehydroergosterol, in eighty milliliters of methylene chloride, cooled by a Dry-Ice and trichloroethylene bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 percent of the theoretical), melting point 91–97 degrees centigrade, which yielded a dinitrophenylhydrazone derivative in 72.5 percent yield, melting point 212–238 degrees centigrade. The aldehyde was recrystallized and found to have a purified melting point of 163–170 degrees centigrade, while the dinitrophenylhydrazone derivative was recrystallized until a melting point of 250-254 degrees centigrade was attained.

*Preparation 10.—Maleic anhydride adduct of 3-beta - acetoxy - 22 - acetoxybisnor - 5,7,9(11),- 20(22)-cholatetraene*

A mixture of twenty grams of the maleic anhydride adduct of 3-beta-acetoxybisnor-5,7,9-(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy-22-acetoxybisnor-5,7,9(11),20(22) - cholatetraene, which melted at 186 to 193 degrees centigrade. Recrystallization of the crude product from a mixture of acetone and pentane raised the melting point to 200.5 to 202 degrees centigrade.

*Preparation 11*

In a manner essentially that described in Preparation 10, the following compounds were prepared:

(1) The dimethyl maleate adduct of 3-beta-benzoyloxy - 22 - acetoxybisnor - 5,7,9(11),20-(22)-cholatetraene, which melted at 210 to 211 degrees centigrade.

(2) The dimethyl maleate adduct of 3-beta-acetoxy - 22 - acetoxybisnor - 5,7,9(11),20(22)- cholatetraene, which melted at 181 to 183 degrees centigrade.

In the same manner as given above, 22-acyloxy, e. g., formoxy, acetoxy, propionoxy, butyroxy, valeroxy, hexanoyloxy, heptanoyloxy, octanoyloxy, benzoyloxy, naphthoyloxy, and the like 3 - acyloxybisnor - 5,7,9(11),20(22) - cholatetraene adducts, are obtained from the compounds of Preparations 6, 7, and 8. Such representative compounds include 3-formoxy-22-acetoxybisnor-5,7,9(11),20(22) - cholatetraene, 3 - propionoxy-22 - acetoxybisnor - 5,7,9(11),20(22) - cholatetraene, 3,22-dipropionoxybisnor-5,7,9(11),20(22)-cholatetraene, 3,22 - dibenzoyloxybisnor - 5,7,9-(11),20(22) - cholatetraene, 3,22 - dibenzoyloxybisnor - 5,7,9(11),20(22) - cholatetraene, and 3 - heptanoyloxy - 22 - octanoyloxybisnor - 5,7,9-(11),20(22)-cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

EXAMPLE.—3(BETA), 22-DIACETOXY-5,7,9(11), 20(22)-BISNORCHOLATETRAENE (a) *Dimethylaniline.*—A solution of one gram of the maleic anhydride adduct of 3(beta),22-diacetoxy - 5,7,9(11),20(22) - bisnorcholatetraene in ten milliliters of dimethyl aniline was heated under reflux for five hours, and the excess amine removed under reduced pressure. Upon crystallization of the residue there was thus obtained 0.65 gram (80 percent of theory) of 3(beta),22 - diacetoxy - 5,7,9(11),20(22) - bisnorcholatetraene, which melted at 108 to 121 degrees centigrade.

(b) *N,N-dimethylbenzylamine.*—A solution of one gram of the maleic anhydride adduct of 3(beta),22 - diacetoxy - 5,7,9(11),20(22) - bisnorcholatetraene in ten milliliters of N,N-dimethylbenzylamine was heated under reflux for four hours, and the excess amine removed under reduced pressure. The residue was dissolved in fifty milliliters of ethyl ether, washed with an equal volume of cold one percent sulfuric acid, cold five percent sodium carbonate solution, water, and dried. Upon removal of the solvent by distillation and crystallization of the residue from methanol, there was obtained 0.73 gram of 3(beta),22 - diacetoxy - 5,7,9(11),20(22) - bisnorcholatetraene, which melted at 112 to 122 degrees centigrade.

(c) *N-ethylpyrrolidine.*—A solution of one gram of the maleic anhydride adduct of 3(beta),-22 - diacetoxy - 5,7,9(11),20(22) - bisnor - cholatetraene in ten milliliters of N-ethylpyrrolidine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.69 gram of 3(beta),22-diacetoxy-5,7,9(11),20-(22)-bisnorcholatetraene, which melted at 108 to 121 degrees centigrade.

(d) *Morpholine.*—A solution of one gram of the maleic anhydride adduct of 3(beta),22-diacetoxy - 5,7,9(11),20(22) - bisnorcholatetraene in ten milliliters of morpholine was heated in an autoclave at 175 degrees centigrade for four hours, cooled, and the excess amine removed by distillation under reduced pressure. The residue was dissolved in 100 milliliters of ethyl ether, washed with equal volumes of cold one percent sulfuric acid, cold five percent sodium carbonate solution, water, and dried. The solvent was removed by distillation and the residue dissolved in 100 milliliters of benzene and chromatographed over alumina. There was thus obtained 0.15 gram of 3(beta),22 - diacetoxy - 5,7,9(11),20(22) - bisnorcholatetraene, which melted at 110 to 122 degrees centigrade.

In a manner similar to the above there can be obtained from the corresponding 3,22-diacyloxy-5,7,9(11),20(22)-bisnorcholatetraene maleic anhydride adducts, 3-formoxy-, 3-propionoxy-, 3-butyroxy-, 3-isobutyroxy-, 3-valeroyloxy-, 3-hexanoyloxy-, 3-heptanoyloxy-, and 3-octanoyloxy-22-acetoxy - 5,7,9(11),20(22) - bisnorcholatetraenes, 3-benzoyloxy-22-acetoxy- or propionoxy-5,7,9(11),20(22)-bisnorcholatetraene, 3-acetoxy-22 - propionoxy - 5,7,9(11),20(22) - bisnorcholatetraene, 3 - propionoxy - 22 - butyroxy-5,7,9(11),-20(22) - bisnorcholatetraene, 3-butyroxy-22-octanoyloxy-5,7,9(11),20(22) - bisnorcholatetraene, 3-butyroxy-22-benzoyloxy - 5,7,9(11),20(22) - bisnorcholatetraene, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 3,22-diacyloxy - 5,7,9(11),20(22) - bisnorcholatetraene wherein the acyloxy groups are of the formula AcO, Ac being the residue of an unsubstituted organic monocarboxylic acid containing up to and including eight carbon atoms.

2. 3,22-diacetoxy - 5,7,9(11),20(22) - bisnorcholatetraene.

3. Process for the production of a 3,22-diacyloxy-5,7,9(11),20(22)-bisnorcholatetraene which comprises heating a 5:8 maleic anhydride adduct of said compound, in the presence of an organic amine, at a temperature between about 100 and 225 degrees centigrade, and separating the 3,22-diacyloxy-5,7,9(11),20(22)-bisnorcholatetraene from the reaction product.

4. Process of claim 3, wherein the temperature is between about 175 and 200 degrees centigrade.

5. Process of claim 3, wherein the amine is dimethylaniline.

6. Process of claim 3, wherein the adduct is an adduct of 3,22-diacetoxy-5,7,9(11),20(22)-bisnorcholatetraene.

ROBERT H. LEVIN.
A VERN McINTOSH, Jr.
GEORGE B. SPERO.

No references cited.